United States Patent [19]

Ito

[11] Patent Number: 4,906,077

[45] Date of Patent: Mar. 6, 1990

[54] ZOOM LENS SYSTEM FOR USE IN A COMPACT CAMERA

[75] Inventor: Takayuki Ito, Tokyo, Japan

[73] Assignee: Asahi Kogaku Kogyo Kabushiki Kaisha, Tokyo, Japan

[21] Appl. No.: 300,885

[22] Filed: Jan. 24, 1989

[30] Foreign Application Priority Data

Jan. 29, 1988 [JP] Japan ................... 63-19092

[51] Int. Cl.$^4$ .............................. G02B 15/14
[52] U.S. Cl. .................. 350/423; 350/427; 350/432
[58] Field of Search ............. 350/423, 426, 427, 432

[56] References Cited

U.S. PATENT DOCUMENTS

| 4,720,179 | 1/1988 | Ito | 350/423 |
|---|---|---|---|
| 4,818,081 | 4/1989 | Ito | 350/426 |
| 4,836,660 | 6/1989 | Ito | 350/423 |
| 4,838,669 | 6/1989 | Ogata et al. | 350/427 |

FOREIGN PATENT DOCUMENTS

| 128911 | 10/1981 | Japan . |
|---|---|---|
| 201213 | 12/1982 | Japan . |
| 184916 | 10/1983 | Japan . |
| 57814 | 4/1985 | Japan . |
| 78522 | 4/1987 | Japan . |
| 90611 | 4/1987 | Japan . |
| 264019 | 11/1987 | Japan . |

Primary Examiner—P. M. Dzierzynski
Attorney, Agent, or Firm—Sughrue, Mion, Zinn, Macpeak & Seas

[57] ABSTRACT

In a zoom lens system of the type which includes a first lens group having a positive focal length and a second lens group having a negative focal length and which performs zooming by adjusting the distance between the two lens groups, the first lens group is composed of a first lens unit having a small power and having a positive or negative focal length and a second lens unit having a positive focal length, the first lens unit being of a two-group-two-element composition which comprises, in order from the object side, a first positive meniscus lens element having a convex surface of large curvature directed toward the object and a second meniscus lens element of large thickness that has a concave surface of large curvature on the object side and a convex surface of large curvature on the image plane side.

6 Claims, 10 Drawing Sheets

ZOOM LENS SYSTEM FOR USE IN A COMPACT CAMERA

BACKGROUND OF THE INVENTION

The present invention relates to a zoom lens system suitable for use in a compact camera that is subject to less constraint with respect to back focus than a zoom lens system for use in a single-lens reflex camera.

The following four types of zoom lens systems have conventionally bee used in compact cameras:

(I) a two-group system of the telephoto type that consists of a first lens group having a positive focal length and including a diaphragm stop and a second lens group having a negative focal length. Such lens systems are disclosed in JP-A-56-128911 (the term "JP-A" as used herein means an "unexamined published Japanese patent application"). JP-A-57-201213. JP-A-62-90611 and JP-A-62-264019;

(II) a three-group system that is a modification of the two-group system (I) and which consists of a first lens group having a positive focal length and including a diaphragm stop, a second lens group having a positive focal length, and a third lens group having a negative focal length, as disclosed in JP-A-58-184916;

(III) a four-group system that consists of a first lens group having a positive focal length, a second lens group having a negative focal length, a third lens group having a positive focal length and a fourth lens group having a negative focal length, as disclosed in JP-A-60-57814; and (IV) a three-group system which is a modification of the four-group system (III) in that the second and third lens groups are integrated into a single group, as disclosed in JP-A-62-78522.

The above-described conventional zoom lens systems have the following problems.

The two-group system (I) has been the subject of active studies and many versions of it have been proposed. Although it features a very simple lens (optical) composition, this type of zoom lens system suffers from the disadvantage that the first and second lens groups especially the second lens group, have to be moved by a large amount during zooming, causing difficulty in designing an efficient mechanical, structure.

The three-group system (II) differs from the two-group system (I) only in that the first lens group is divided into two positive units, so the amount of lens movement required is no smaller than in the first type.

The four-group system (III) features a smaller amount of lens movement than the first two types. However, because of the complex structure due to the use of the four lens groups and on account of the great power presented by individual lens groups, especially the second and third lens groups, poor workmanship in lens manufacture can cause substantial adverse effects on system performance, so that utmost care must be exercised in the process of lens manufacture.

The three-group system (IV) requires as small an amount of lens movement as in the four-group system (III) but it will suffer a larger amount of deterioration in the performance of individual lens groups than types (I) and (II) if poor workmanship occurs in lens manufacture.

Systems (III) and (IV) have a common problem in that the lenses in the first group are larger in diameter than in systems (I) and (II).

The zoom lens system of the present invention adopts the method of zooming used in the conventional two-group system (I). The assignee of the present invention has previously proposed several versions of system (I) that featured a smaller lens length in spite of increased back focus and which also succeeded in reducing the required amount of lens movement compared to other two-group type zoom lens systems by increasing the powers of individual lens groups, particularly by increasing the negative power of the second lens group to decrease its required amount of movement. An example of this type of system is described in JP-A-62-264019 (hereinafter referred to as "the prior invention"). However, this prior invention is disadvantageous in terms of cost, since it requires no fewer than 8 lens elements, which are too many for the purpose of attaining a zoom ratio of about 2.

SUMMARY OF THE INVENTION

The present invention has been accomplished in order to solve the aforementioned problem of the prior invention. An object, therefore, of the present invention is to provide a zoom lens system for use in a compact camera in which the number of lens elements in the first group is reduced by one, thereby reducing the production cost. In spite of this reduction in the number of lens elements employed, the zoom lens system of the present invention is as compact as the system of the prior invention and compares favorably in its compensation for coma and distortion.

The zoom lens system of the present invention includes, in order from the object side, a first lens group having a positive focal length and a second lens group having a negative focal length, with zooming being performed by adjusting the distance between the two lens groups. The first lens group having a positive focal length is composed, in order from the object side, of a first lens unit of a small power which has a positive or negative focal length and second lens unit having a positive focal length. The first lens unit is of the two-group-two-element composition which consists, in order from the object side, of a first positive meniscus lens element having a convex surface of large curvature directed toward the object and a second meniscus lens element of large thickness that has a concave surface of large curvature on the object side and a convex surface of large curvature on the image plane side. The first lens group satisfies the following conditions:

(1) $|f_{1G}/f_{1a}| < 0.35$ (2) $0.1 < d_3/f_S < 0.35$ (3) $0.8 < h_{x1}/h_{x4} < 1.0$ wherein
$f_{1G}$: the focal length of the first lens group;
$f_{1a}$: the focal length of the first lens unit:
$d_3$: the thickness of the second meniscus lens element:
$f_S$: the focal length of the overall system at the wide-angle end;
$h_{x1}$: the height at Which paraaxial rays of light intersect the lens surface (first surface) of the first lens unit which is the closest to the object: and
$h_{x4}$: the height at which paraaxial rays of light intersect the lens surface (fourth surface) of the first lens unit which is the closest to the image.

In a preferred embodiment, the first positive meniscus lens element in the first lens unit satisfies the following condition:

(4) $0 < f_S/f_1 < 0.5$ where $f_1$ is the focal length of said lens element.

In another preferred embodiment, the first positive meniscus lens element has an aspheric surface.

In still another preferred embodiment, the first positive meniscus lens element is a plastic lens having an aspheric surface and satisfies the following condition:

(4) $0 < f_S/f_1 < 0.3$.

In another preferred embodiment, the second lens unit is a cemented positive lens having a divergent surface of large power which is composed of a biconvex positive lens element and a negative meniscus lens element having a concave surface of large curvature on the object side.

In still another preferred embodiment, the second lens group is composed of, in order from the object side, a positive lens element having a convex surface of large curvature directed toward the image plane and two negative meniscus lens elements having a concave surface of large curvature directed toward the object.

BRIEF DESCRIPTION OF THE DRAWINGS

The invention will be more clearly understood from the following description in conjunction with the accompanying drawings, wherein.

DETAILED DESCRIPTION OF THE INVENTION

Figure 1:
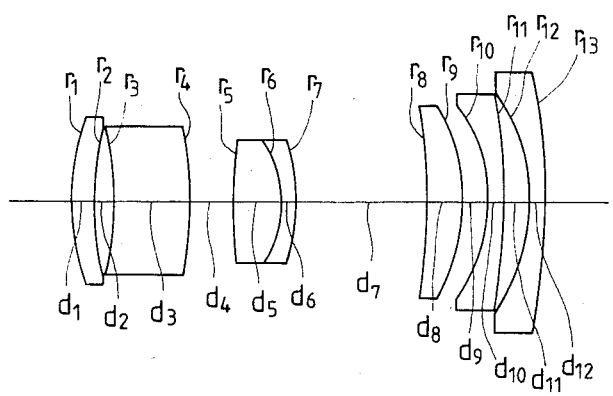
FIGS. 1, 3, 5, 7 and 9 are simplified cross-sectional views of the zoom lens systems at the wide-angle end that are constructed in accordance with Examples 1-5, respectively, of the present invention.
Figure 2A:
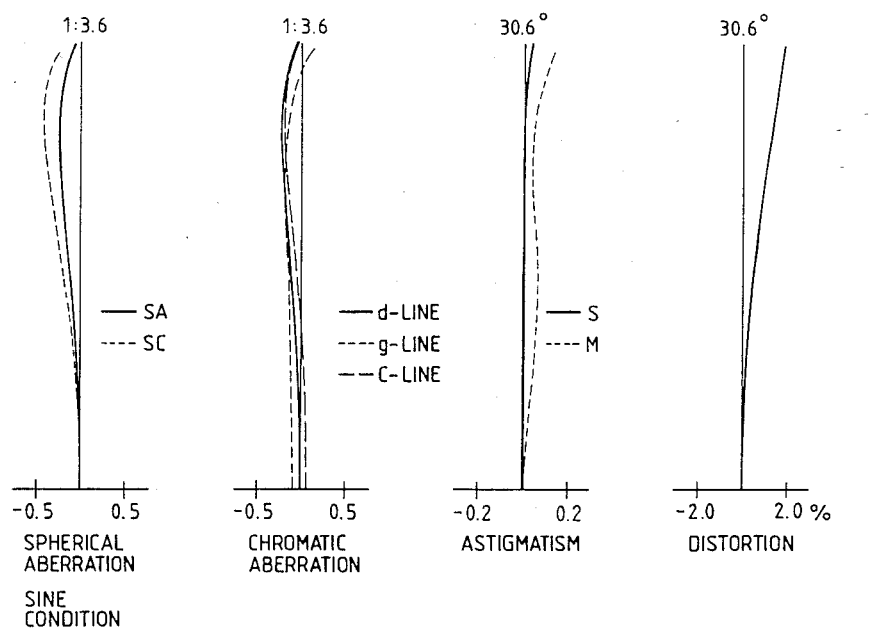
FIGS. 2(a), 4(a), 6(a), 8(a) and 10(a) are graphs plotting the aberration curves obtained with the zoom lens systems of Examples 1-5, respectively, at the wide-angle end.
Figure 2B:
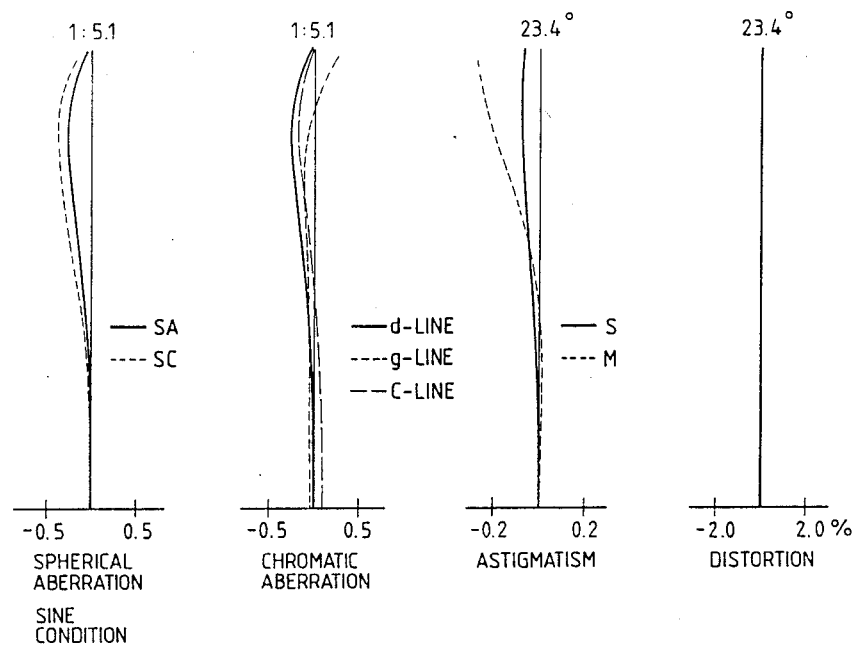
FIGS. 2(b), 4(b), 8(b) and 10(b) are graphs plotting the aberration curves obtained with the zoom lens systems of Examples 1-5. respectively, at the middle focal length.
Figure 2C:
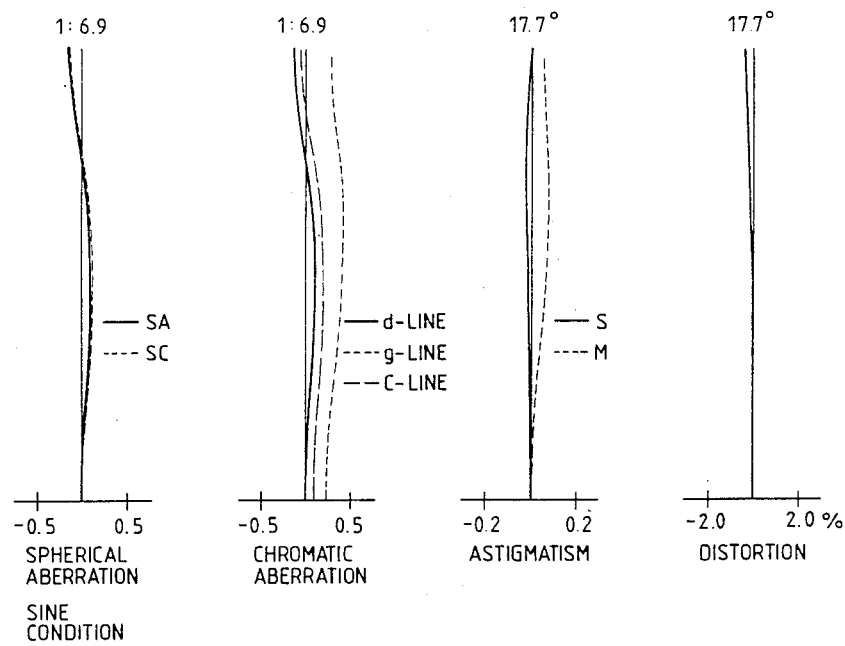
FIGS. 2(c), 4(c), 6(c), 8(c) and 10(c) are graphs plotting the aberration curves obtained with the zoom lens systems of Examples 1-5. respectively, at the narrow-angle end.
Figure 3:
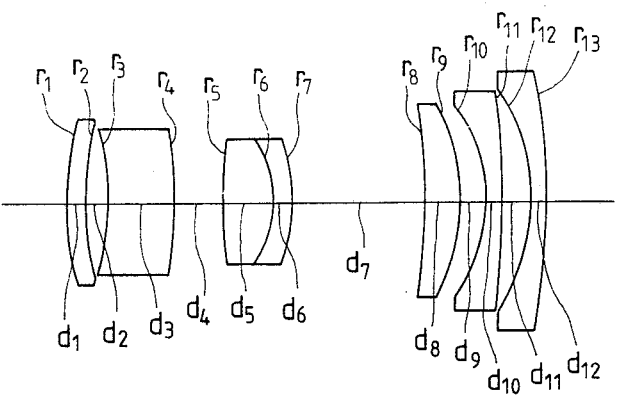
Figure 4A:
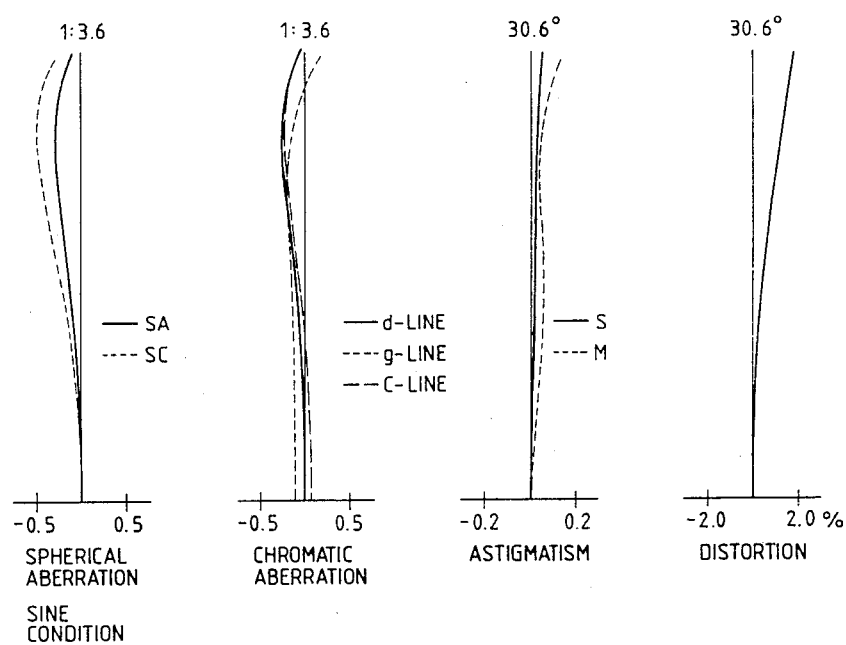
Figure 4B:
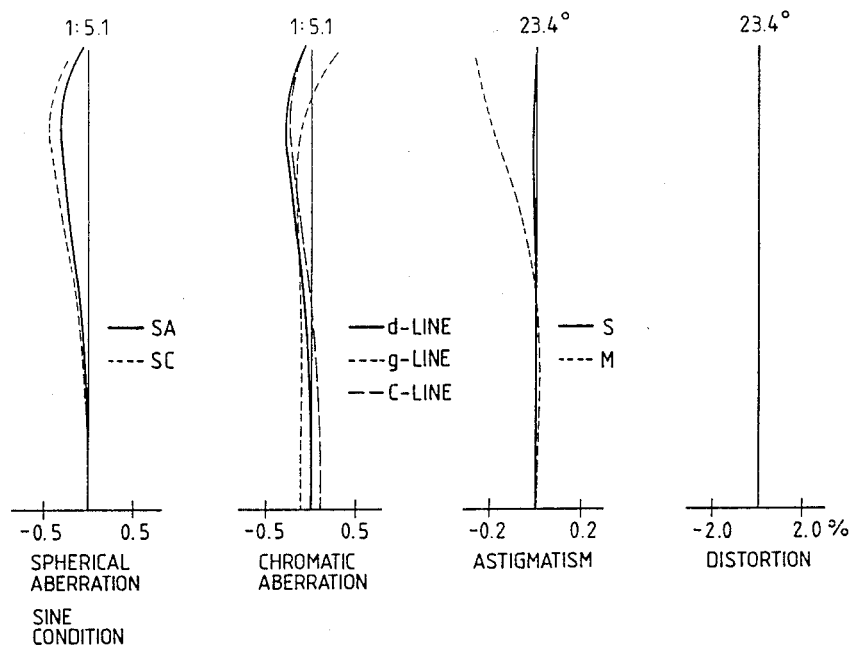
Figure 4C:
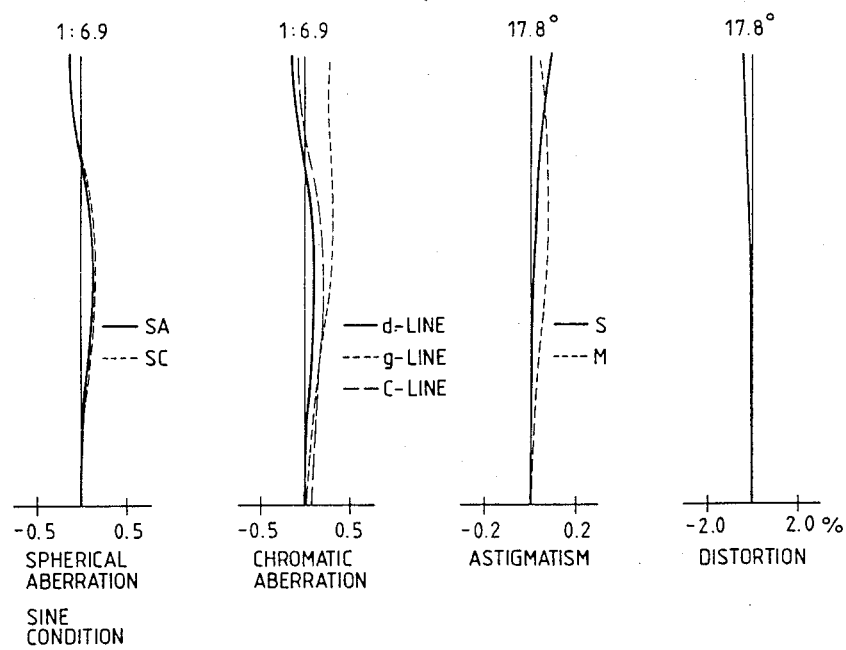
Figure 5:
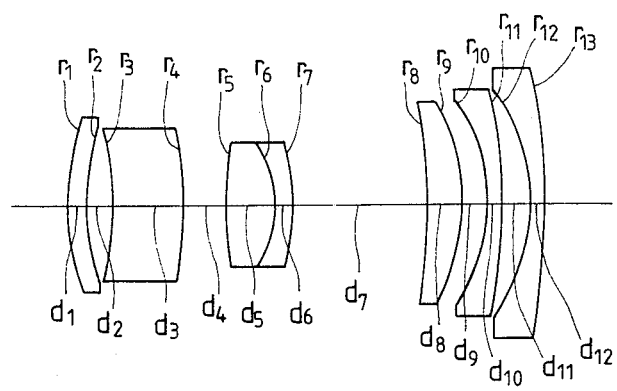
Figure 6A:
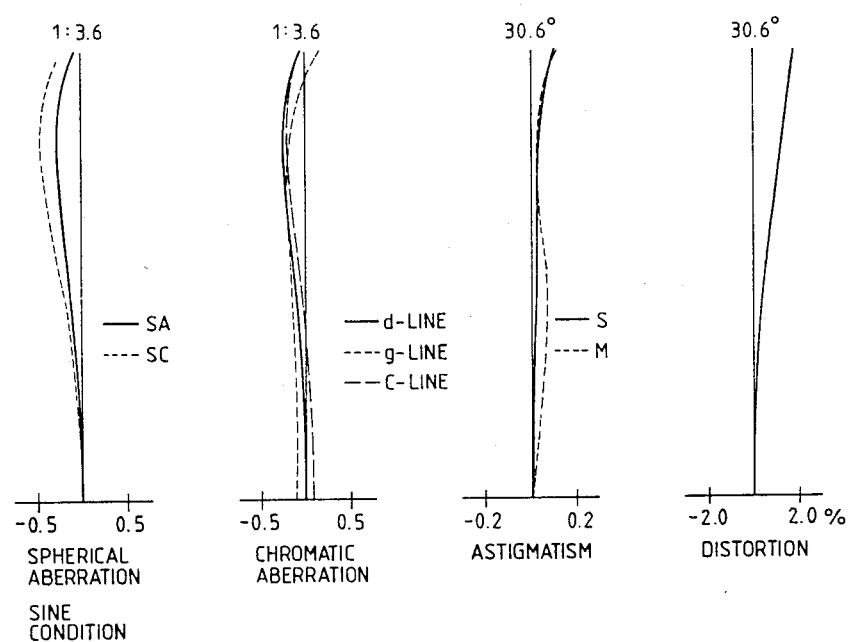
Figure 6B:
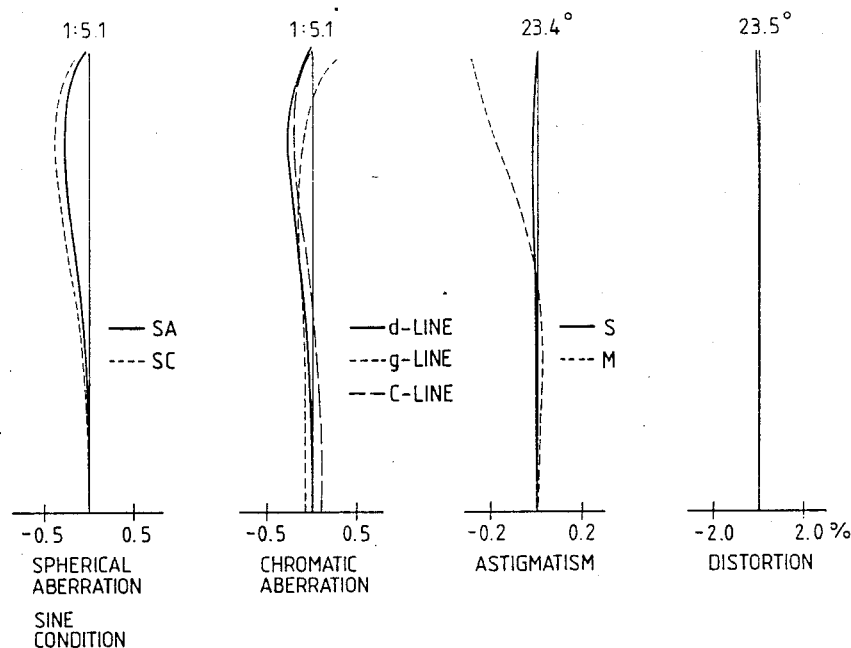
Figure 6C:
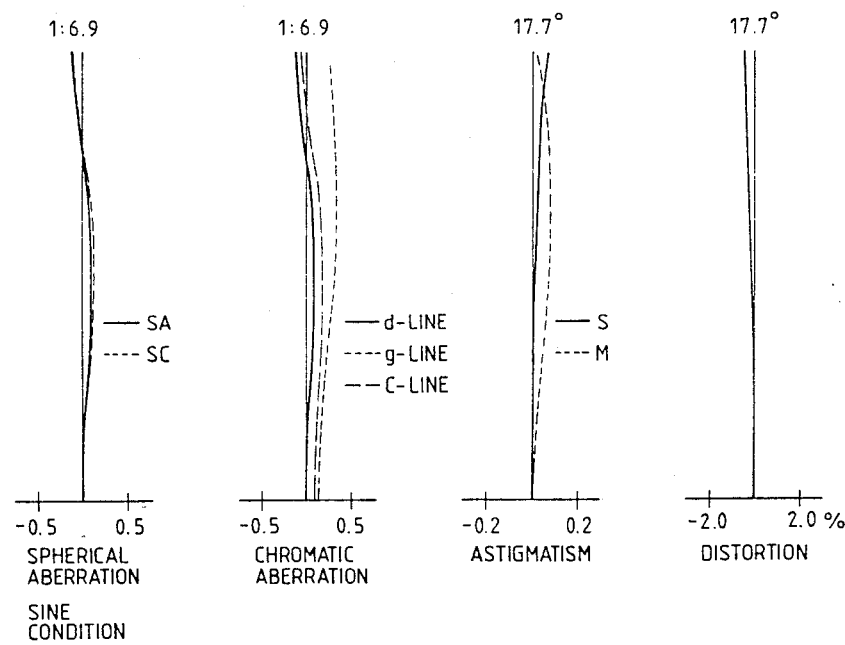
Figure 7:
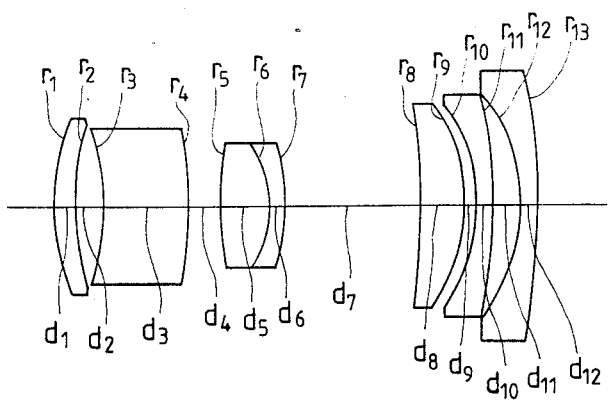
Figure 8A:
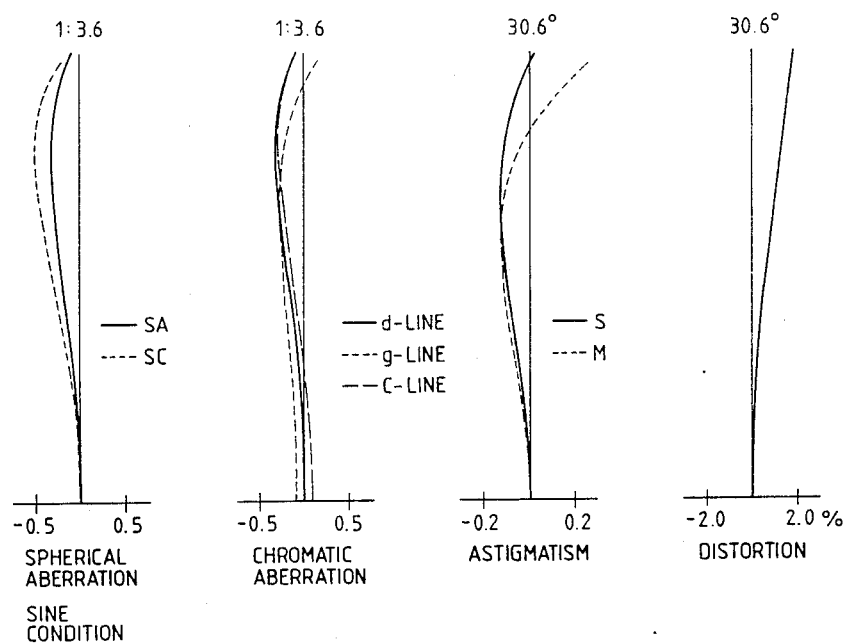
Figure 8B:
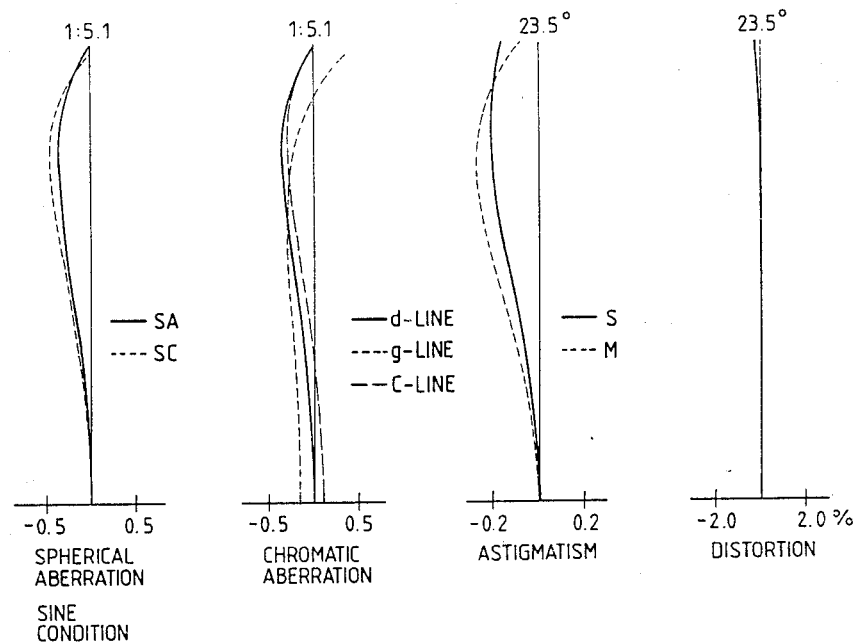
Figure 8C:
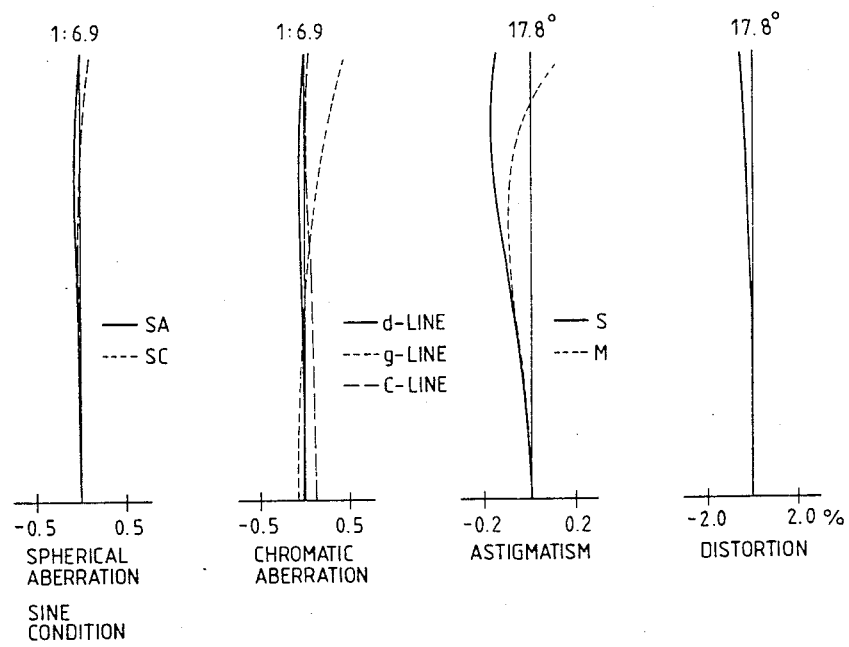
Figure 9:
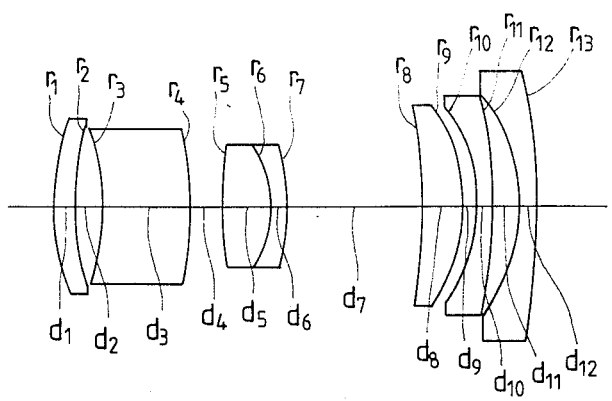
Figure 10A:
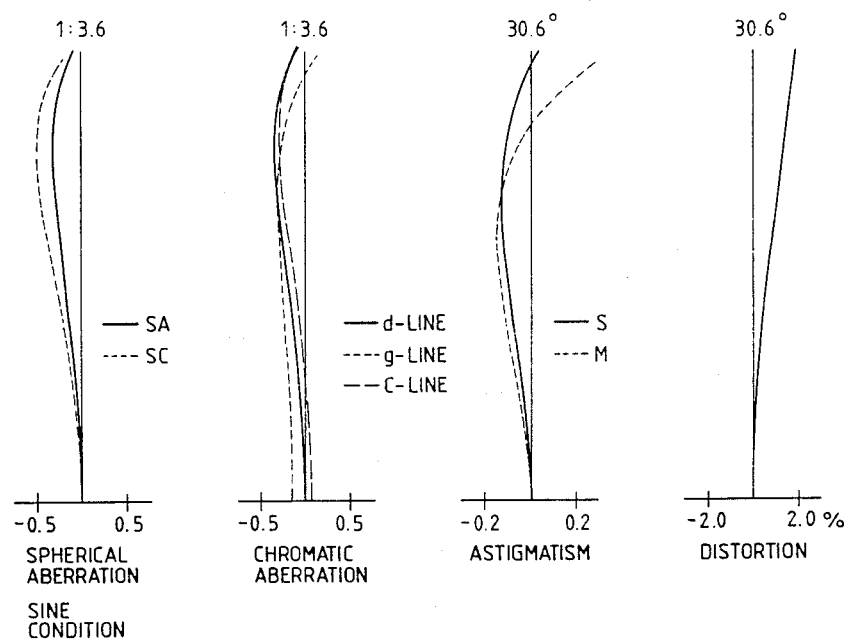
Figure 10B:
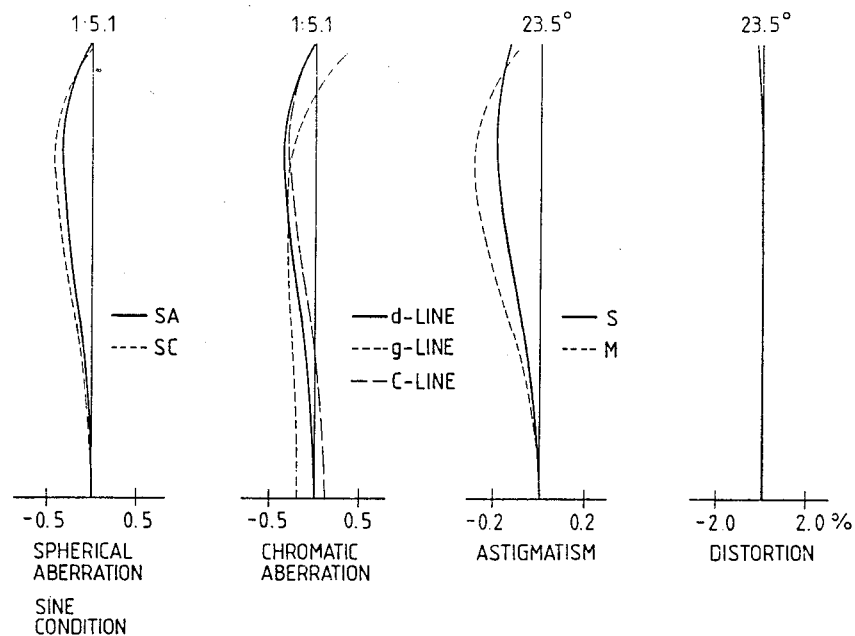
Figure 10C:
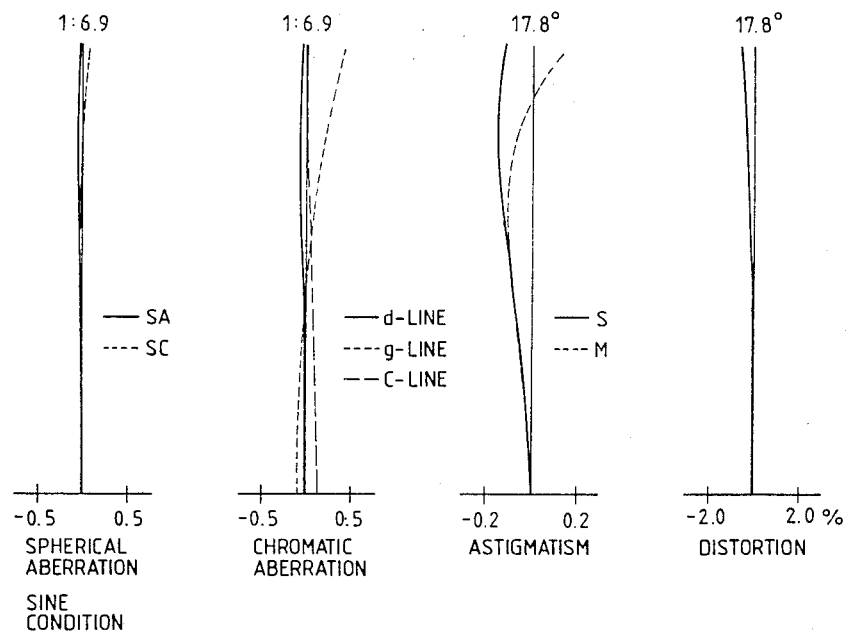

A first embodiment of the invention will now be described.

The zoom lens system of the present invention includes, in order from the object side. a first lens group having a positive focal length and a second lens group having a negative focal length, with zooming being performed by adjusting the distance between the two lens groups. The first lens group having a positive focal length is composed, in order from the object side, of a lens unit 1a of a small power which has a positive or negative focal length and another lens unit 1b having a positive focal length. The lens unit 1a is of the two-group-two-element composition which consists, in order from the object side, of a first positive meniscus lens element having a convex surface of large curvature directed toward the object and a second meniscus lens element of large thickness that has a concave surface of large curvature on the object side and a convex surface of large curvature on the image plane side. The first lens group satisfies the following conditions:

(1) $|f_{1G}/f_{1a}| < 0.35$ (2) $0.1 < d_3/f_S < 0.35$ (3) $0.8 < h_{x1}/h_{x4} < 1.0$ wherein
$f_{1G}$: the focal length of the first lens group:
$f_{1a}$: the focal length of lens unit 1a;
$d_3$: the thickness of the second meniscus lens element:
$f_S$: the focal length of the overall system at the wide-angle end;
$h_{x1}$: the height at which paraaxial rays of light intersect the lens surface (first surface) of the lens unit 1a which is the closest to the object; and
$h_{x4}$: the height at which paraaxial rays of light intersect the lens surface (fourth surface) of the lens unit 1a which is the closest to the image.

In this first embodiment, the first positive meniscus lens element in lens unit 1a also satisfies the following condition:

(4) $0 < f_S/f_1 < 0.5$ where $f_1$ is the focal length of said lens element.

The various conditions set forth above which are to be satisfied by the zoom lens system of the present invention are described below more specifically.

Condition (1) relates to the power of the first lens unit 1a in the first lens group. Lens unit 1a preferably has a small power in order to reduce its sensitivity to poor workmanship during lens manufacture. If the upper limit of condition (1) is exceeded, the power of lens unit 1a is increased and it becomes so sensitive to poor Workmanship in lens manufacture that the production rate will be reduced due to large Variations in the quality of the manufactured lenses.

Condition (2) relates to the thickness of the second meniscus lens element. If the upper limit of this condition is exceeded, the result is favorable for the purpose of effective compensation for aberrations. On the other hand, the thickness of that lens element is increased so much that its weight will also increase noticeably, which is contrary to the important goal of reducing lens weight. If the lower limit of condition (2) is not reached, paraaxial rays of light tend to intersect at a lower portion of the fourth lens surface (this result is associated with condition (3) to be described below), and the resulting decrease in the power of the first lens unit 1a makes it difficult to reduce the overall length of the lens system.

Condition (3) also relates to the first lens unit 1a. As already stated in connection with condition (1). lens unit 1a in the system of the present invention is characterized by having a small power. However, notwithstanding this small power, lens unit 1a works as if it were a wide converter in a known afocal system. If the lower limit of condition (3) is not reached, the composite focal length of the first lens unit 1a and the second lens unit 1b is too small to achieve effective compensation for astigmatism at maximum view angle on the wide-angle side. If the upper limit of condition (3) is exceeded, lens unit 1a will work as a teleconverter rather than a wide converter, thereby increasing not only the overall length of the lens system but also the amount of lens movement.

Condition (4) relates to the power of the first positive meniscus lens element of the first lens unit 1a. As mentioned above, lens unit 1a taken as a whole works as a wide converter of small power. If the upper limit of condition (4) is exceeded, the positive power of the first positive meniscus lens element becomes so large that the optical load on the divergent surface of the second meniscus lens system will be increased to produce undesired higher-order aberrations. If the lower limit of condition (4) is not reached, the first positive meniscus lens element will not be able to have a positive focal length and the balance with the divergent surface of the second meniscus lens element will be upset to cause difficulty in compensating for the curvature of field.

If the first positive meniscus lens element is provided with an aspheric surface, it becomes possible to achieve even more effective compensation for astigmatism at the maximum view angle on the wide-angle side.

Condition (4) sets forth the requirement to be satisfied for enabling the first positive meniscus lens element to be made of a plastic material. This condition requires a smaller power than condition (4). If the upper limit of this condition is exceeded, focusing becomes highly sensitive to the temperature and humidity of the plastic material of which the first positive meniscus lens element is made. The resulting lens system is not suitable for use in a compact camera because it cannot be brought into focus manually, although it ensures good lens performance at ordinary temperatures. If the lower limit of condition (4.) is not reached, the result is the same as when the lower limit of condition (4) is not reached.

The lens composition of the system of the present invention will be described more specifically below. One of the major characteristics of this system is that the first lens unit 1a is composed of two meniscus lens elements. In spite of the fact that the first lens group has a positive focal length, the first lens unit 1a can be provided with the ability to work as a wide converter by incorporating a special design in the geometry of the second meniscus lens element, whereas a conventional wide converter has a negative and a positive lens element arranged in order from the object side.

The system of the present invention has no basic difference from the system of the prior invention with respect to the second lens unit 1b and the second lens group. However, in a preferred embodiment, the second lens unit 1b may be designed as a cemented positive lens having a divergent surface of large power which is composed of a biconvex positive lens element and a negative meniscus lens element having a concave surface of large curvature on the object side. An advantage of this arrangement is that the positive power of the first lens group is sufficiently increased to enable reduction in the overall length of the lens system, and that good performance can yet be ensured over the full zooming range.

In another preferred embodiment, the second lens group may be composed of, in order from the object side, a positive lens element having a convex surface of large curvature directed toward the image plane and two negative meniscus lens elements having a concave surface of large curvature directed toward the object. This arrangement enables the power of the second lens group to be increased by a substantial amount, thereby reducing the required amount of movement of each lens group (in particular, the second lens group) without compromising the lens performance.

Examples 1-5 of the present invention are described below by way of data sheets in which $F_{NO}$ signifies an F number, f represents a focal length, w represents a half view angle, $f_B$ represents a back focus, r represents the radius of curvature of an individual lens surface, d represents the lens thickness or the aerial distance between lens surfaces. N represents the refractive index of an individual lens at the d-line, and represents the Abbe number of an individual lens. The shape of an aspheric surface may be expressed by the following formula:

$$x = \frac{Cy^2}{1 + \sqrt{1 - c^2 y^2}} + A_4 y^4 + A_6 y^6 + A_8 y^8$$

where
- x : displacement from the apex of a lens in the direction of the optical axis;
- y : displacement in a direction perpendicular to the optical axis;
- C : constant (the reciprocal of the radius of curvature of a lens at its apex): and
- $A_4, A_6, A_8$: asphericity coefficients.

Example 1

$F_{NO} = 1:3.6 \sim 5.1 \sim 6.9$  $f = 36.00 \sim 50.00 \sim 68.00$
$\omega = 30.6° \sim 23.4° \sim 17.7°$  $f_B = 9.71 \sim 23.45 \sim 41.13$

| Surface No. | r | d | N | ν |
|---|---|---|---|---|
| 1 | 21.482 | 1.879 | 1.49186 | 57.4 |
| 2 | 28.350 | 2.100 | (plastic lens) | |
| 3 | −22.302 | 6.552 | 1.74000 | 28.3 |
| 4 | −32.334 | 3.695 | | |
| 5 | 37.359 | 4.178 | 1.58900 | 48.6 |
| 6 | −10.353 | 1.300 | 1.80518 | 25.4 |
| 7 | −17.940 | 11.550~6.471~3.467 | | |
| 8 | −45.199 | 3.010 | 1.80518 | 25.4 |
| 9 | −17.234 | 2.203 | | |
| 10 | −14.780 | 1.350 | 1.83400 | 37.2 |
| 11 | −49.158 | 2.289 | | |
| 12 | −16.910 | 1.400 | 1.83400 | 37.2 |
| 13 | −54.155 | | | |

Second surface: aspheric
$A_4 = 0.39440396 \times 10^{-4}$  $A_6 = -0.10963057 \times 10^{-6}$
$A_8 = 0.87940830 \times 10^{-8}$
$f_{1G}/f_{1a} = -0.04$
$d_3/f_s = 0.182$
$h_{x1}/h_{x4} = 0.948$
$f_s/f_1 = 0.218$

Example 2

$F_{NO} = 1:3.6 \sim 5.1 \sim 6.9$  $f = 36.00 \sim 50.00 \sim 68.00$
$\omega = 30.6° \sim 23.4° \sim 17.8°$  $f_B = 10.19 \sim 24.01 \sim 41.6$

| Surface No. | r | d | N | ν |
|---|---|---|---|---|
| 1 | 24.849 | 1.678 | 1.58547 | 29.9 |
| 2 | 29.005 | 1.952 | (plastic lens) | |
| 3 | −23.443 | 6.004 | 1.80518 | 25.4 |
| 4 | −32.772 | 4.094 | | |
| 5 | 38.310 | 4.281 | 1.58875 | 51.2 |
| 6 | −10.217 | 1.581 | 1.80518 | 25.4 |
| 7 | −17.178 | 11.335~6.659~3.46 | | |
| 8 | −56.398 | 3.034 | 1.80518 | 25.4 |
| 9 | −17.807 | 2.216 | | |
| 10 | −14.509 | 1.350 | 1.83400 | 37.2 |
| 11 | −70.942 | 2.329 | | |
| 12 | −17.954 | 1.400 | 1.83400 | 37.2 |
| 13 | −52.327 | | | |

Second surface: aspheric
$A_4 = 0.43505483 \times 10^{-4}$  $A_6 = -0.63119745 \times 10^{-7}$
$A_8 = 0.92651621 \times 10^{-8}$
$f_{1G}/f_{1a} = -0.0785$
$d_3/f_s = 0.167$
$h_{x1}/h_{x4} = 0.939$

Example 2-continued $F_{NO} = 1:3.6 \sim 5.1 \sim 6.9$    $f = 36.00 \sim 50.00 \sim 68.00$
$\omega = 30.6° \sim 23.4° \sim 17.8°$    $f_B = 10.19 \sim 24.01 \sim 41.6$

| Surface No. | r | d | N | ν |
|---|---|---|---|---|
| $f_s/f_1 = 0.140$ | | | | |

Example 3

$F_{NO} = 1:3.6 \sim 5.1 \sim 6.9$    $f = 36.00 \sim 50.00 \sim 68.00$
$\omega = 30.6° \sim 23.4° \sim 17.7°$    $f_B = 9.71 \sim 23.61 \sim 41.47$

| Surface No. | r | d | N | ν |
|---|---|---|---|---|
| 1 | 20.184 | 1.760 | 1.73101 | 40.3 |
| 2 | 23.029 | 2.291 | | |
| 3 | −21.745 | 6.246 | 1.76182 | 26.5 |
| 4 | −31.355 | 3.565 | | |
| 5 | 35.245 | 4.192 | 1.58900 | 48.6 |
| 6 | −10.236 | 1.535 | 1.80518 | 25.4 |
| 7 | −17.986 | 11.690~6.793~3.459 | | |
| 8 | −41.660 | 3.055 | 1.80518 | 25.4 |
| 9 | −16.655 | 2.059 | | |
| 10 | −14.658 | 1.350 | 1.83400 | 37.2 |
| 11 | −41.379 | 2.253 | | |
| 12 | −16.246 | 1.400 | 1.83400 | 37.2 |
| 13 | −54.551 | | | |

Second surface: aspheric
$A_4 = 0.24426859 \times 10^{-4}$    $A_6 = -0.59747061 \times 10^{-7}$
$A_8 = 0.58113040 \times 10^{-8}$
$f_{1G}/f_{1a} = -0.055$
$d_3/f_s = 0.174$
$h_{x1}/h_{x4} = 0.954$
$f_s/f_1 = 0.203$

Example 4

$F_{NO} = 1:3.6 \sim 5.1 \sim 6.9$    $f = 36.00 \sim 50.00 \sim 68.00$
$\omega = 30.6° \sim 23.5° 17.8°$    $f_B = 9.60 \sim 23.53 \sim 41.44$

| Surface No. | r | d | N | ν |
|---|---|---|---|---|
| 1 | 18.226 | 1.996 | 1.69350 | 53.2 |
| 2 | 24.406 | 2.343 | | |
| 3 | −19.917 | 7.600 | 1.83400 | 37.2 |
| 4 | −30.583 | 2.715 | | |
| 5 | 31.903 | 4.198 | 1.58267 | 46.4 |
| 6 | −9.876 | 1.318 | 1.80518 | 25.4 |
| 7 | −18.885 | 11.780~6.839~3.476 | | |
| 8 | −44.034 | 3.469 | 1.80518 | 25.4 |
| 9 | −14.871 | 1.056 | | |
| 10 | −14.690 | 1.350 | 1.83400 | 37.2 |
| 11 | −38.401 | 2.596 | | |
| 12 | −14.293 | 1.400 | 1.83400 | 37.2 |
| 13 | −56.299 | | | |

$f_{1G}/f_{1a} = 0.011$
$d_3/f_s = 0.211$
$h_{x1}/h_{x4} = 0.956$
$f_s/f_1 = 0.390$

Example 5

$F_{NO} = 1:3.6 \sim 5.1 \sim 6.9$    $f = 36.00 \sim 50.00 \sim 68.00$
$\omega = 30.6° \sim 23.5° \sim 17.8°$    $f_B = 9.61 \sim 23.57 \sim 41.53$

| Surface No. | r | d | N | ν |
|---|---|---|---|---|
| 1 | 18.738 | 1.956 | 1.74950 | 35.3 |
| 2 | 24.516 | 2.369 | | |
| 3 | −19.778 | 7.600 | 1.80518 | 25.4 |
| 4 | −30.516 | 2.649 | | |
| 5 | 31.746 | 4.190 | 1.58267 | 46.4 |
| 6 | −9.865 | 1.300 | 1.80518 | 25.4 |
| 7 | −18.829 | 11.730~6.810~3.461 | | |
| 8 | −39.803 | 3.372 | 1.80518 | 25.4 |
| 0 | −14.875 | 1.220 | | |
| 10 | −14.417 | 1.350 | 1.83400 | 37.2 |
| 11 | −35.666 | 2.434 | | |
| 12 | −14.576 | 1.400 | 1.83400 | 37.2 |
| 13 | −55.903 | | | |

$f_{1G}/f_{1a} = 0.012$

Example 5-continued $F_{NO} = 1:3.6 \sim 5.1 \sim 6.9$    $f = 36.00 \sim 50.00 \sim 68.00$
$\omega = 30.6° \sim 23.5° \sim 17.8°$    $f_B = 9.61 \sim 23.57 \sim 41.53$

| Surface No. | r | d | N | ν |
|---|---|---|---|---|
| $d_3/f_s = 0.211$ | | | | |
| $h_{x1}/h_{x4} = 0.958$ | | | | |
| $f_s/f_1 = 0.389$ | | | | |

As described above, the zoom lens system of the present invention is basically the same as the system of the "prior invention" with respect to the second lens group but it is improved over the latter in terms of production cost in that the number of lens elements in the first group is reduced by one. In spite of this reduction in the number of lens elements employed, the zoom lens system of the present invention is as compact as the system of the prior invention and assures comparable or better lens performance. In the zoom lens system of the prior invention, the first lens group is composed of a first lens unit having a negative focal length, a second lens unit 1b having a positive focal length, and a positive lens element 1m disposed between lens units 1a and 1b. In contrast, lens unit 1a in the system of the present invention has a two-group-two-element composition which consists, in order from the object side, of a first positive meniscus lens element having a convex surface of large curvature directed toward the object, and a second meniscus lens element of large thickness that has a concave surface of large curvature on the object side and a convex surface of large curvature on the image plane side and which is produced by integrating into a unitary assembly the final negative lens element in lens unit 1a and the positive lens element 1m in the first lens group of the system of the prior invention. Besides this great simplicity in the composition of lens unit 1a and its unique geometry, the first lens group in the system of the present invention is designed to satisfy conditions (1) to (3) set forth herein, so that aberrations including spherical aberration, coma and astigmatism can be compensated in an effective manner.

What is claimed is:

1. In a zoom lens system for use in a compact camera which comprises, in order from the object side, a first lens group having a positive focal length and a second lens group having a negative focal length and which performs zooming by adjusting the distance between the two lens groups, the improvement wherein said first lens group having a positive focal length comprises, in order from the object side, a first lens unit having a small power and a second lens unit having a positive focal length, said first lens unit being of a two-group-two-element composition which comprises, in order from the object side, a first positive meniscus lens element having a convex surface directed toward the object and a second meniscus lens element of large thickness that has a concave surface on the object side and a convex surface on the image plane side, said first lens group satisfying the following conditions:

(1) $|f_{1G}/f_{1a}| < 0.35$ (2) $0.1 < dhd\ 3/f_S < 0.35$ (3) $0.8 < h_{x1}/h_{x4} < 1.0$ wherein $f_{1G}$ represents the focal length of the first lens group. $f_{1a}$ represents the focal length of the first lens unit, $d_3$ represents the thickness of the second meniscus lens element, $f_S$ represents the focal length of the overall system at the wide-angle end, $h_{x1}$ represents the height at which paraaxial rays of light intersect the lens surface of the first lens unit which is the closest to the object of the lens surfaces of lens unit, and $h_{x4}$ represents the height at which paraaxial rays of light intersect the lens surface of the first lens unit which is closest to the image.

2. A zoom lens system according to claim 1, wherein the first positive meniscus lens element in the first lens unit satisfies the following condition:

(4) $0 < f_S/f_1 < 0.5$ where $f_1$ is the focal length of said first positive meniscus lens element.

3. A zoom lens system according to claim 2, wherein the first positive meniscus element in the first lens unit has an aspheric surface.

4. A zoom lens system according to claim 3, wherein the first positive meniscus lens element in the first lens unit is a plastic lens having an aspheric surface and satisfies the following condition:

(4) $0 < f_S/f_1 < 0.3$.

5. A zoom lens system according to claim 1, wherein the second lens unit is a cemented positive lens having a divergent surface of large power which comprises a biconvex positive lens element and a negative meniscus lens element having a concave surface of large curvature on the object side.

6. A zoom lens system according to claim 1, wherein the second lens group comprises, in order from the object side, a positive meniscus lens element having a convex surface directed toward the image plane and two negative meniscus lens elements having a concave surface directed toward the object.

* * * * *